(12) United States Patent
Cerny et al.

(10) Patent No.: US 6,869,529 B2
(45) Date of Patent: Mar. 22, 2005

(54) AUTOMATIC CHEMICAL FEED SYSTEM

(76) Inventors: Dennis Cerny, 1113 Mountain Glen Way, Carol Stream, IL (US) 60188; Garrett Garcia, 261 Oakwood Ct., Wheaton, IL (US) 60187

( * ) Notice: Subject to any disclaimer, the term of this patent is extended or adjusted under 35 U.S.C. 154(b) by 0 days.

(21) Appl. No.: 10/378,009

(22) Filed: Mar. 4, 2003

(65) Prior Publication Data

US 2004/0173514 A1 Sep. 9, 2004

(51) Int. Cl.[7] .............................................. C02F 1/00
(52) U.S. Cl. .................... 210/198.1; 137/268; 422/266; 422/264
(58) Field of Search ...................... 210/198.1; 137/268; 422/266, 264

(56) References Cited

U.S. PATENT DOCUMENTS

| | | | | |
|---|---|---|---|---|
| 3,163,174 A | * | 12/1964 | Pintz ..................... | 137/101.27 |
| 3,366,459 A | * | 1/1968 | Richards .................. | 210/198.1 |
| 3,915,187 A | * | 10/1975 | McCalla et al. ........ | 137/101.27 |
| 5,101,851 A | * | 4/1992 | Abadi et al. ................... | 137/91 |
| 5,549,875 A | * | 8/1996 | Laughlin et al. ............ | 422/266 |

* cited by examiner

Primary Examiner—Duane Smith
Assistant Examiner—Douglas J. Theisen
(74) Attorney, Agent, or Firm—Basil E. Demeur; Alan B. Samlan; David J. Hurley

(57) ABSTRACT

There is disclosed an automatic chemical feed system for retro-fitting to any existing fluid circulating system of the type having an inlet pipe which feeds water to a fluid reservoir and an outlet pipe for feeding fluid to the circulating system, the present system including an inlet pipe adapter for inner connection with the inlet pipe, a fluid diverter connected to the adapter for diverting a portion of the flow, a chemical chamber containing a supply of fluid purification chemicals in solid particulate format, the chamber being in fluid communication with the diverter, and the chamber having an inlet opening for allowing fluid to enter the chamber, and an outlet opening for passing treated fluid out of the chamber back to the fluid reservoir for circulation in the circulating system.

7 Claims, 3 Drawing Sheets

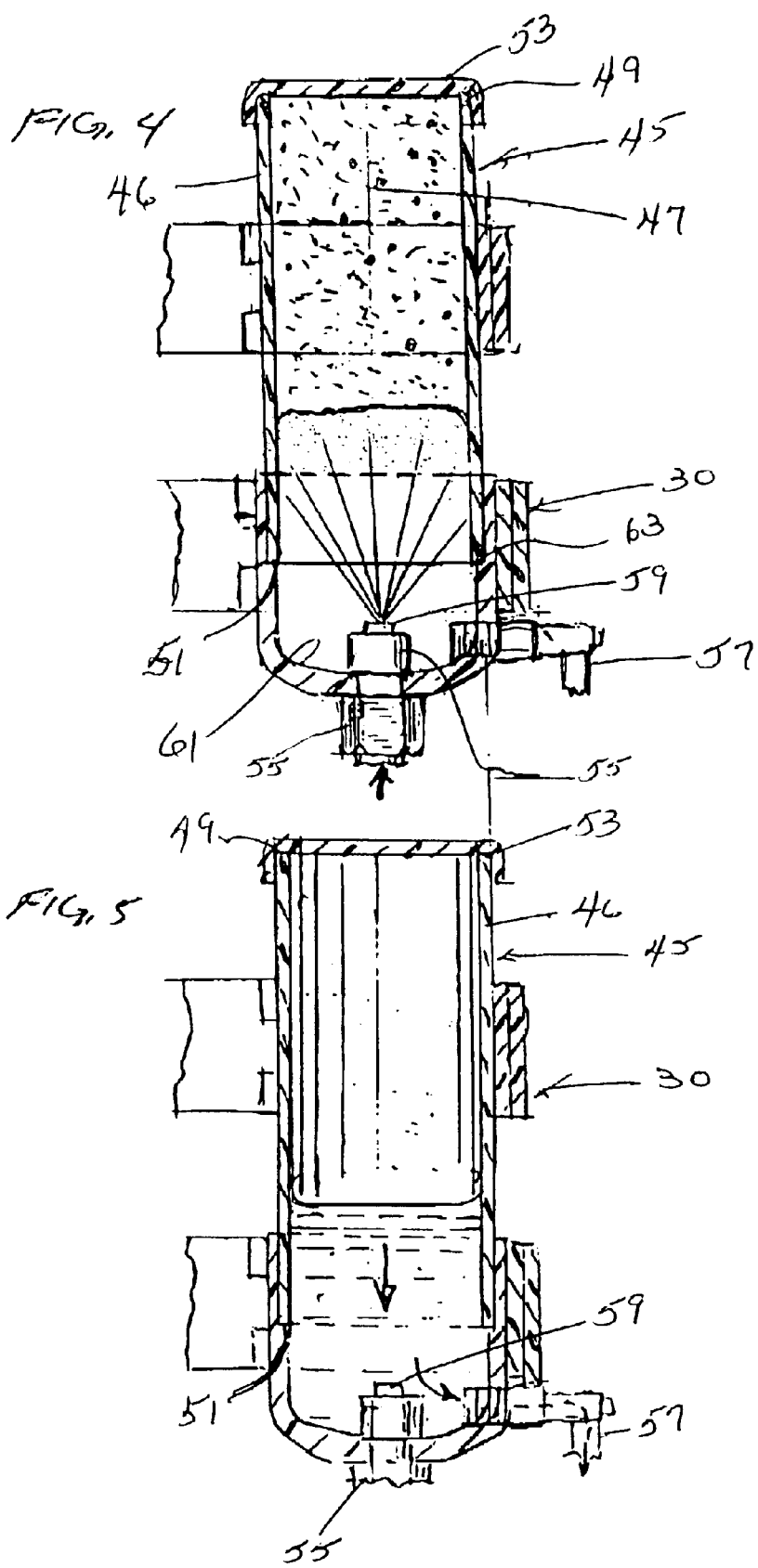

AUTOMATIC CHEMICAL FEED SYSTEM

BACKGROUND OF THE INVENTION

The present invention deals with and is directed to an automatic chemical feed system intended for feeding chemicals into the fluid of a fluid circulating system whether it is of the closed or open type, for the purpose of treating and removing contaminants which enter into a fluid in a fluid circulating system.

It is well known that in a typical circulation system, wherein a fluid such as water is circulated either incident to an air conditioning system, or for other reasons such as a heating system or the like, the liquid such as water, which flows through the system usually becomes contaminated with a variety of contaminants. This is especially true in the types of systems which have open tank reservoirs which are typically placed on the roof of a building. The contaminants may include contaminants in the air, which could include a variety of minerals or metals as well as microbial contaminants which are airborne. Contaminants also include scaling compounds which emanate from the piping system of the circulating system, and where the scaling can build up within the system and ultimately cause damage to the metal portions of the system. It is therefore important that virtually all systems have some type of chemicals which are fed into the system for the purpose of removing the most common contaminants incident to that particular system.

In the typical installation, the purification chemicals are usually brought onto the site in drums or kegs of some type, and are physically fed into the fluid reservoir on a timed basis. Often times, this is done manually, and in some instances, it can be done by a pumping system. For example, when the purification chemicals are in a liquid form, pumping systems are developed for pumping the liquid purification chemicals into the reservoir in a certain concentration in order to treat the fluid. The prior art has concerned itself with automating such types of systems wherein timing devices are used for the timed disbursement of liquid purification chemicals into the system.

In terms of the prior art, and for example, U.S. Pat. No. 3,163,174 shows a system which adds extra plumbing in order to bleed off water from the liquid circulating system, and treats the make up water which is added to the system as water evaporates. In this instance, the make-up water creates a vacuum to pull chemicals out of a separate tank and into the liquid tower. In this manner, the chemicals which are provided in a separate tank of purification chemicals are methodically placed into the system.

Another prior art U.S. Pat. No. 5,101,851 shows a system designed particularly for the removal of minerals from the water in the tank. In this instance, the patentee teaches a system which cycles on at a predetermined time which is determined by measuring the density or conductivity of the water in the system. The system will cycle on a solenoid to bleed water out of the system and carry out the contaminants. Indeed, the particular system disclosed in the aforesaid patent does not add chemicals to the system, but rather, bleeds off contaminated water and permits fresh make-up water to enter the system. The bleeding off occurs if the water reaches a certain level which would indicate that the water in the system has picked up a certain percentage of minerals and therefore needs to be removed with fresh water added.

It will be noted that the system disclosed therein uses a series of pumps and chemical drums and puts chemicals in the make-up water. In effect, the system disclosed the aforementioned patent is a density meter.

U.S. Pat. No. 3,915,187 shows another type of feed system which depends upon a venturi principal. It will be noted that in order to employ the system disclosed in the —187 patent, there is a requirement that the existing plumbing of the tower be changed in order to install this system. A float is provided which when it calls for water, permits make-up water to enter into the system and creates a vacuum. The vacuum then sucks chemicals into the water line thereby purifying the water. It should be noted that the purification chemicals which must be used in the system require that they be in liquid form in order for the system to operate as disclosed.

The present invention is intended to provide an automatic feed system which is retro-fittable to any existing circulating system without the need for changing the plumbing or electrical systems which are in place relative to such systems. Further, the present system uses purification chemicals which are in a solid particulate format rendering the use of such chemicals convenient and easier to use thereby avoiding the need to haul and position multiple gallon drums of chemicals into a use position.

BRIEF SUMMARY OF THE INVENTION

In summary, the present invention provides a retro-fittable automatic chemical feed system which consists of three basic components. The system includes a universal adapter for inter-connection to the inlet pipe which leads into the fluid reservoir of the system. Down line from the adapter is a fluid diverter which is provided with a first and a second flow pipe. The first flow pipe flows directly to the fluid reservoir and simply allows the make-up water entering the system to flow directly into the reservoir. The diverter also includes a second flow pipe which diverts a portion of the make-up water to a chemical chamber which contains a supply of purification chemicals in a solid particulate format. The chemical chamber has an inlet which is in fluid communication with the second flow pipe allowing the make-up water to enter the chamber and a fluid outlet which permits treated water to return back to the fluid reservoir once treated. The chemical chamber is held in a fixture and is designed such that the chamber is removable in totality from the fixture. In this manner, a chemical chamber may be provided for the system which is pre-packed with purification chemicals in solid format, and once exhausted, the entire chemical chamber may be removed from the fixture for the replacement with another chamber having a fresh supply of purification chemicals.

The entire system as disclosed herein is easily mountable in any position adjacent to or in proximity of an existing liquid circulation system and totally eliminates the need for changing the piping or electrical system which may be in place relative to any existing circulating system. Once the universal adapters are connected to the inlet pipe, the system operates automatically relative to the circulating system.

OBJECTS AND ADVANTAGES

It is therefore the principal object of the present invention to provide an automatic chemical feed system for fluid circulating systems for the purpose of treating and removing contaminants contained in the fluid in the system which is retro-fittable to any existing system, and operates autonomously of the piping and electrical systems incident to the existing circulating system.

Incident to the foregoing object, it is a further object of the present invention to provide an automatic chemical feed system of the type disclosed which includes a universal adapter which is intended to inter-connect to the inlet pipe of the circulating system, a fluid diverter down line and in fluid communication with the universal adapter having a first flow pipe in fluid communication with the fluid reservoir, and a second flow pipe which diverts a portion of the make-up water to the automatic chemical feed system, a chemical chamber containing a supply of purification chemicals in a solid format, the chemical chamber being in fluid communication with the second flow pipe, having an inlet for permitting water to enter into the chemical chamber, and a fluid outlet for permitting treated fluid to flow out of the chemical chamber and back to the fluid reservoir.

In conjunction with the foregoing object, is a further object of the invention to provide a fixture for mounting and carrying the chemical chamber in lockingly releasable fashion such that the chamber having a supply of purification chemicals may be removed from the fixture and replaced with a fresh chemical chamber having a fresh supply of purification chemicals once the chemical supply of chamber is exhausted.

Further objects and advantages of the present invention will best be understood when taken in conjunction with the following specification and drawings. The present description is intended to describe the best mode of the invention, but it will be understood that various modifications may be made therein, all of which are still within the true spirit and scope of the invention.

BRIEF DESCRIPTION OF DRAWINGS

FIG. 4 is a side elevational view in cross section, showing the manner in which the chemical chamber is locked into the mounting fixture and having the purification chemicals contained therein in a solid particulate format; and FIG. 5 is a side elevational view in cross section, showing the chemical chamber being exhausted of purification chemicals which are dissolved in the liquid and flowing out of the chemical chamber via the fluid outlet.

DETAILED DESCRIPTION OF DRAWINGS

Figure 1:
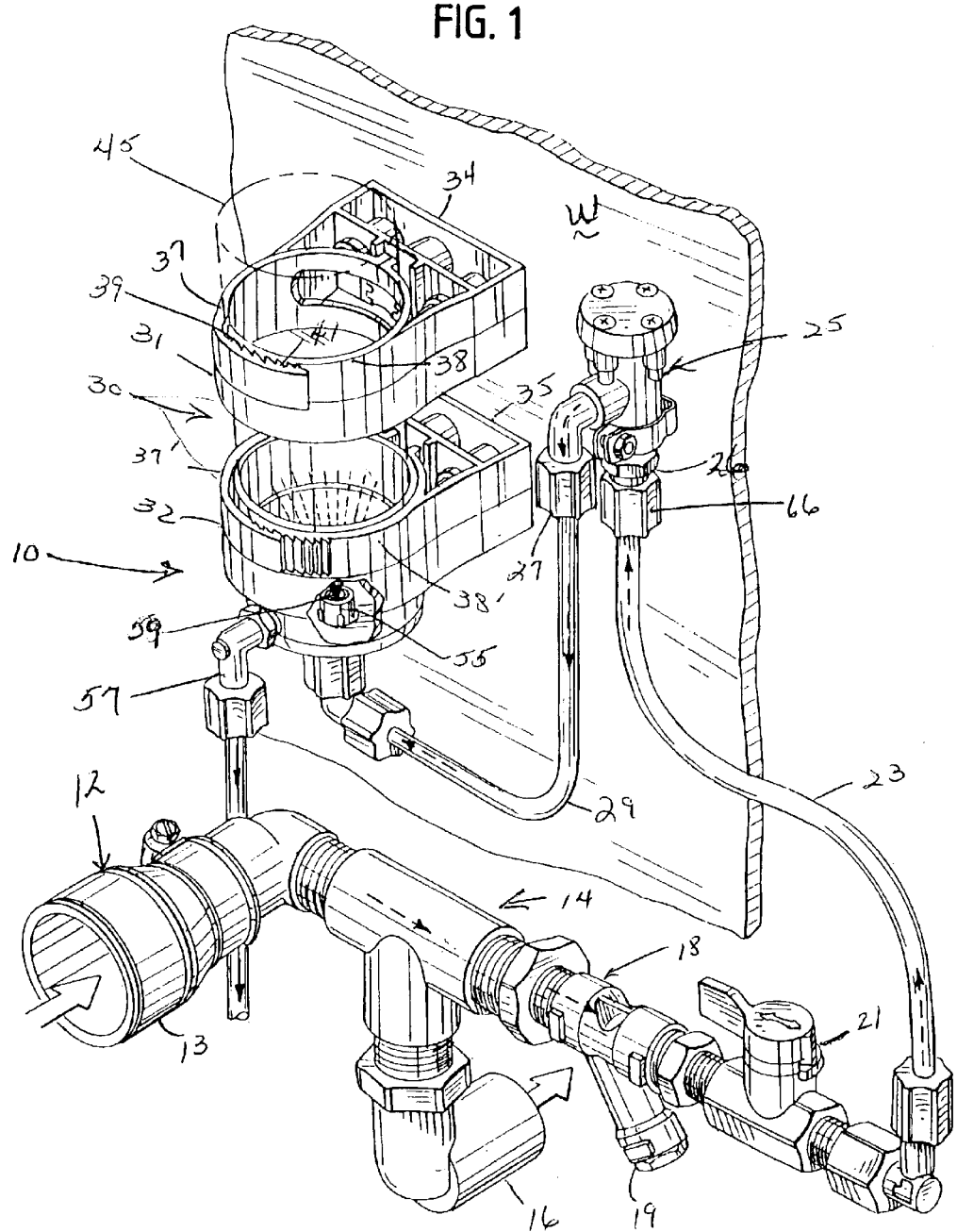
FIG. 1 is a perspective view showing the entire automatic chemical feed system of the present invention which includes the universal adapter, the flow diverter down line of the adapter, the diverter being in fluid communication with the liquid reservoir via the first flow pipe, and with the chemical chamber contained with the fixture via the second flow pipe.
Figure 2:
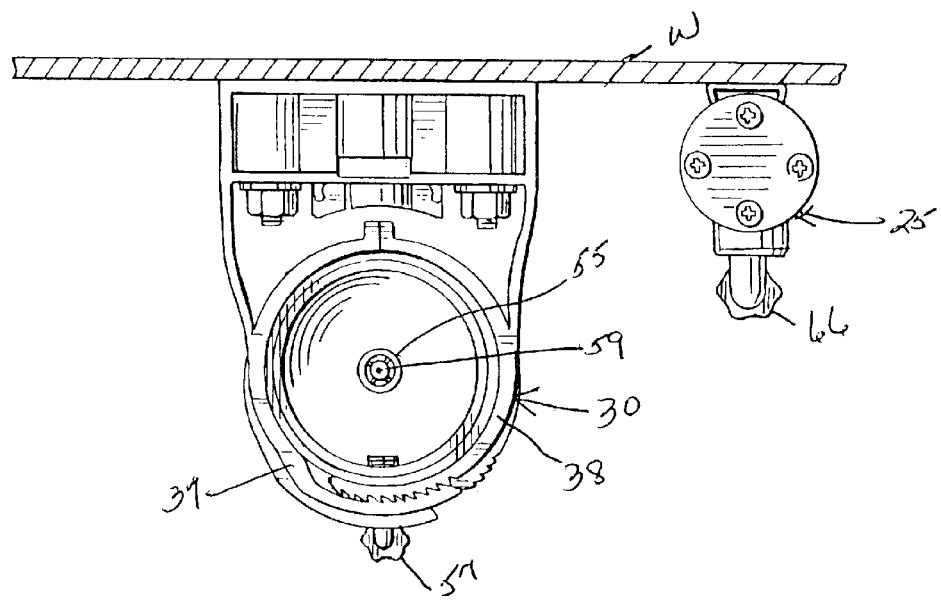
FIG. 2 is a top view, partly in cross section, showing the mounting fixture for containing the chemical chamber as mounted to a wall structure of the liquid circulating system.
Figure 3:
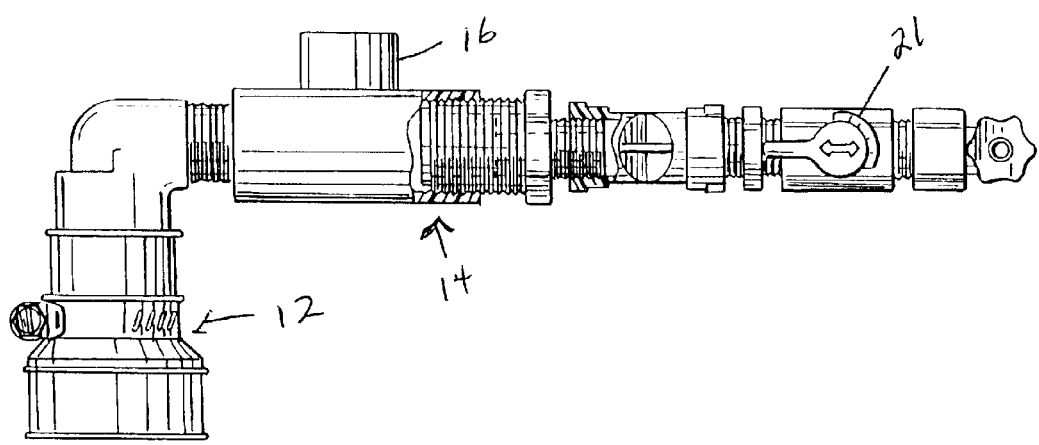
FIG. 3 is a top view showing the adapter in fluid communication with the flow diverter incident to the inventive system of the present invention.

The automatic chemical feed system of the present invention is generally illustrated by the numeral 10 in FIG. 1. The basic components of the system generally include a universal adapter 12 which will generally consist of a semi-flexible circular collar 13 which is intended to slip onto the inlet pipe (not shown) of a typical fluid circulating system. The collar 13 will be connected to the pipe by suitable means, which is well know in the art, such as for example, a bolt strap or other fastening device. The universal adapter 12 is shown to be connected to a fluid diverter 14 which is either in the form of a t-shaped arrangement, or it may be a y-shaped arrangement. As is shown in FIG. 1, a first flow pipe 16 branches off from the diverter 14, and is in fluid communication with the fluid reservoir (not shown) which is a part of a typical fluid circulating system. The diverter 14 further includes a second flow pipe 18 which is adapted to divert a portion of the flow of fluid entering in through the universal adapter 12 to the purification portion of the system as will be described hereafter. A second flow pipe may be provided with a clean out 19 and a flow control valve 21 which thereby permits the operator to temporarily discontinue the flow of fluid through the purification system and dean out any debris or any other materials as may be necessary before fluid flows through the purification system.

The second flow pipe 18 is shown to be in fluid communication with the purification system via flexible pipe 23. Flexible pipe 23 connects to a vacuum breaker 25 which will operate to prevent backflow as is well known in the art. It is commonly known that vacuum breakers 25 are generally required in certain fluid circulating systems in order to prevent backflow of fluid back into the system in situations where there are shut downs or other problems incident with the system.

The vacuum breaker 25 includes inlet fitting 26 and an outflow fitting 27. The vacuum breaker 25 is connected to the purification portion of the system by means of flow pipe 29.

The system includes a mounting fixture 30 which as shown in FIG. 1, consists of a pair spaced apart substantially circular mounting straps 31 and 32 respectively. Each of the mounting straps 31 and 32 include support walls 34 and 35 respectively which may be mounted to an underlying support surface such as a wall W. With reference to mounting strap 31, and as shown in FIG. 1 of the drawings, in this embodiment, the mounting strap 31 is in the form of a pair of mounting arms 37 and 38 each of which is provided with opposed locking teeth 39 and 41 respectively. The mounting arms 37 and 38 are made of a semi-rigid plastic material that have some degree of flexibility such that the arms may be pushed together until the locking teeth engage and may be disengaged by simply lifting one mounting arm away from the other mounting arm to dislodge the locking teeth.

As is shown in FIG. 1 and in FIG. 4, the system includes a chemical chamber 45 which, in this embodiment is shown as a cylindrical tube 46 which contains a mass of purification chemicals in a solid particulate format. The purification chemicals 47 (FIG. 4) may be any one of the diverse number of chemicals which are designed for purifying a particular fluid system. Those chemicals will be described hereinafter.

The chemical chamber 45 is therefore installed in the system by dislodging the mounting arms of each of the mounting straps 31 and 32 and placing the chemical chamber 45 therein. The mounting arms 37 and 38 of mounting strap 31 and 37' and 38' of mounting strap 32 may be then locked together via the locking teeth to securely hold the chemical chamber 45 in place in the system.

It will be observed that the chemical chamber 45 which is in the form of a cylindrical 46 has an upper end 49 and a lower end 51. The upper end 49 is sealed by means of an end cap 53 while the lower end 51 is open. It will also be observed that the purification chemicals 47 are positioned in the tube 46 in a solid format. In connection with manufacturing the chemical chamber 45 having a solid purification chemical 47 therein, cylindrical tube 46 is provided with an end cap 53 and then filled with the purification chemicals which are in liquid format incident to the manufacturing process. The purification chemicals will then solidify and form a solid mass within the cylindrical tube 46. A second end cap (not shown) is positioned over the lower end 51 of the tube 46 and the chamber is shipped to the ultimate consumer in that format. In use, the lower end cap (not shown) is removed, and the cylindrical tube is then inserted into the mounting fixture 30. The mounting arms 37 and 38 are then locked to lockingly engage the chemical chamber 45 therein. The purification chemicals 47 will remain in position within the tube 46 since they are now in a solidified state.

As shown in FIGS. 4 and 5 of the drawings, the mounting fixture 30 includes a fluid inlet 55 and a fluid outlet 57. In the embodiment as depicted in FIG. 4 of the drawings, a fluid inlet 55 is provided with a spray nozzle 59 which is built into the fluid inlet 55. As shown in FIG. 1, the fluid inlet 55 of the mounting fixture 30 is in fluid communication with the second flow pipe 18 of the diverter 14 via the vacuum breaker 25. Hence, fluid enters into the chemical chamber 45 via fluid inlet 55 and is sprayed up into the chemical chamber 45 by means of the spray nozzle 59. The entering fluid will strike the purification chemicals 47 and commence dissolving the same in the fluid. The fluid will then fall to the bottom of the mounting fixture 61 and will pool in that area and ultimately exit via the outlet 57 which then flows back to the fluid reservoir as previously described As shown in FIG. 5 of the drawings, ultimately the chemical chamber 45 will become exhausted of purification chemicals as the same are dissolved in the fluid. The cylindrical tube 46 will then be removed from the mounting fixture 30 by disengaging the mounting arms 37 and 38 and removing the cylindrical tube 46 therefrom. A fresh chemical chamber having a fresh supply of purification chemicals 47 may then be reinstalled in the system rendering the system operational once again.

In the embodiment as shown in FIGS. 4 and 5 of the drawings, a cylindrical tube 46 is positioned within the mounting fixture 30 by inserting the cylindrical tube 46 into the mounting fixture until the lower end 51 of the tube 46 seats against a gasket at lip 63 formed in the bottom portion of the mounting fixture 30. The purification chemicals 47 when manufactured and poured into the cylindrical tube 46, are poured to a level such when inserted into the system, and a solid mass of chemicals 47 will be positioned above the spray nozzle 59. This affords the fluid a spacing sufficient to permit the fluid to flow out of the spray nozzle and strike against the purification chemicals to commence the dissolution process.

Various other formats may be utilized in creating a chemical chamber containing purification chemicals in relationship to the mounting fixture. For example, in those applications where the purification chemicals are in a powdered format, the mechanical details of the chemical chamber and mounting fixture may be altered. The chemical chamber 45 would contain the purification chemicals 47 in a powdered format, and the bottom end of the chamber 45 would be closed off with a tight woven filter. The water inlet to the chamber would then be located at the top portion of the chamber, and water would then flow through the chamber dissolving the chemicals 47. The water would flow through the tight woven filter at the bottom, and exit into the mounting fixture which surrounds the chemical chamber. In this format, the chemical chamber and accompanying mounting fixture would take the form of a filter housing and as water exits the bottom of the chemical chamber 45, the water would rise in the exterior mounting fixture to an outlet located at the top portion of the mounting fixture and flow out to the fluid reservoir. Alternatively, the chemical chamber could include an enclosed bottom, and a top having a water inlet and a water outlet. The water inlet could have a tube affixed to it so that water entering the inlet flows to the bottom of the chemical chamber and as the water fills the chamber and dissolves the powder, and would exit through a fluid outlet at the top of the chamber and flow to the fluid reservoir.

With reference to FIG. 1, it is apparent that the combination of the chemical chamber 45 and the mounting fixture 30 could be replaced quite easily by simply disconnecting those two elements from the system, such as for example, by disconnecting the flexible pipe 23 at nut 66, this would remove the vacuum breaker 25, mounting fixture 30 and chemical chamber 45 as a sub-assembly from the system. In this manner, one could substitute a different format for the chemical chamber and mounting fixture and include a vacuum breaker as well by simply reconnecting an alternate version by reinserting nut 66 to another vacuum breaker 25 which is in fluid communication with a mounting fixture 30 and chemical chamber 45 which would contain a powdered purification chemical therein.

It is therefore apparent from the above description that by providing a universal adapter having a flow diverter in fluid communication therewith to divert a portion of the make-up water to the purification chamber, the precise construction of the purification chamber would become important only insofar as whether the purification chemicals take the form of a solid particulate matter or a powder format. However, in either instance the chemical chamber is designed to be removable from the system and replaced with another chemical chamber once the mass of purification chemicals have been dissolved into the system. Once again, the importance of the chemical chamber is to include purification chemicals contained in the chamber, and provide a fluid inlet and a fluid outlet such that fluid passes through the chamber, dissolves the purification chemicals, and flows out the outlet to the fluid reservoir so that treated fluid is returned to the system. In this manner, the purification chemicals may be of any type which may be required by any particular system. It is known, for example, that biocides generally take a powdered format, and in such instance, one can use a chemical chamber and accompanying mounting fixture which can accommodate the powdered chemicals and still provide a fluid inlet and a fluid outlet so that fluid may be treated and returned to the fluid reservoir. It would therefore be appreciated that the precise mechanical construction of the fluid chamber in concert with the mounting fixture may be altered and still function in accordance with the present invention in that the use of the present system for purifying and eliminating contaminants from a fluid circulating system may be accomplished without changing the piping and or electrical systems incident to the fluid circulation system which is installed in a static structure. The present system therefore may be operated as an autonomous assembly, and may be retro-fitted to any existing fluid circulating system.

Purification chemicals which may be employed in the chemical chamber of the present invention may be selected from any number of available chemicals to accomplish a particular purification process. These would include polymer compounds which are polymaleate based as well as both organic and inorganic corrosion inhibitors. Corrosion inhibitors would include molybdates, silicates and phosphates among others. These inhibitors can be blended to provide mulimetal corrosion protection for both water and air applications. Other chemicals would include anti-foam compounds which alleviate fouling characteristics found in a variety of environments. Anti-scaling compounds may be employed such as polyphosphates, phosphates, aspartic acid and others. Microbiocides may also be employed and typically, these are formulated in a powder format. As was indicated previously, the present invention contemplates the use of a chemical chamber and surrounding mounting fixture which would be adapted to accommodate a powdered format for the purification chemicals, and as such, micro biocides may be employed in the system. Other types of chemicals would also include fragrant odorants, odor control chemicals and the like which are generally used in air handling systems. Hence, virtually any of the chemicals which are presently utilized in connection with a fluid circulating system and provided in a liquid format may be reconstituted in solid format and employed in the present system. Hence, the present system seeks to eliminate the requirement that purification chemicals would only be utilized in a liquid format.

While there has been described what is at present considered to be the preferred embodiment of the invention, it will be appreciated that various modifications may be made therein, and is intended to cover the appended claims any and all variations which are in the true spirit scope of the present invention.

What is claimed is:

1. A retro-fittable automatic chemical feed system for treating and removing undesirable contaminants from a fluid circulating system of the type having an inlet pipe leading to a fluid reservoir in and outlet pipe leading to the circulating system comprising in combination, an inlet pipe adapter including universal connection means for interconnection to the inlet pipe, an inlet fluid diverter connected to said adapter and in fluid communication therewith, said diverter including a first flow pipe in fluid communication with the fluid reservoir and a second fluid pipe for diverting a portion of the fluid flow therethrough, a chemical chamber containing a supply of fluid purification chemicals in a solid particulate format, said chamber having an inlet at one end thereof, said inlet being in fluid communication with said second fluid pipe thereby to permit fluid to enter said chemical chamber, and a fluid outlet provided in said chamber to permit treated fluid to exit said chamber, a vacuum breaker interposed between said diverter and said chamber along the path of said second fluid pipe, said fluid outlet being in communication with said liquid reservoir thereby to return treated fluid to said reservoir preliminary to the circulation of said treated fluid through the circulating system thereby to treat the fluid flowing through the circulation system and remove undesirable contaminants therefrom.

2. A retro-fittable automatic chemical feed system as set forth in claim 1, which further includes a mounting fixture for mounting and carrying said chemical chamber therein, said mounting fixture being adapted for mounting such that said fixture containing said chemical chamber is in fluid communication with said fluid reservoir and includes releasable lock means for permitting the insertion and removal of said chemical chamber when the supply of liquid purification chemicals are exhausted.

3. A retro-fittable automatic chemical feed system as set forth in claim 2 above, wherein said adapter, diverter, vacuum breaker, mounting fixture and chemical chamber comprise an integrated system capable of retro-fittable mounting to any existing liquid circulating system without the need for changing and adapting the existing piping and electrical components of the existing fluid circulation system.

4. A retro-fittable automatic chemical feed system as set forth in claim 2 above, wherein said mounting fixture includes an inlet fitting which is sized and adapted to seat against said inlet of said chemical chamber in fluid sealing engagement such that seatment of said chemical chamber on said mounting fixture positions said chamber inlet and mounting fixture inlet in registry one to the other and provides a fluid path for liquid to enter from said diverter into said chemical chamber.

5. A retro-fittable automatic chemical feed system as set forth in claim 4 above, wherein said inlet fitting of said mounting fixture is provided with a spray nozzle positioned in the path of fluid flow as fluid flows into said chamber, whereby fluid entering said chamber is sprayed into said chamber thereby to maximize contact between the fluid and the liquid purification chemicals contained within said chamber.

6. A retro-fittable automatic chemical feed system as set forth in claim 4 above, wherein said chemical chamber inlet and mounting fixture inlet includes gasket means interposed there between thereby to provide a fluid sealing engagement when said chemical chamber is positioned in said mounting fixture.

7. A method for treating fluid contained within a fluid circulating system of the type having a fluid inlet pipe leading to a fluid reservoir and pumping means for pumping fluid from the reservoir throughout the system and returning the fluid to the fluid reservoir, for the purpose of treating the fluid to move various contaminants which enter the fluid in circulation, comprising the steps of, providing an inlet pipe adapter having universal connection means for connecting to the inlet pipe of the fluid reservoir, providing a fluid diverter down line of said adapter having a first flow pipe in fluid communication with the fluid reservoir and a second flow pipe for diverting a portion of the fluid flow therethrough, providing a chemical chamber containing a supply of fluid purification chemicals in a solid particulate format and having a fluid inlet at one end and fluid communication with said second flow pipe thereby to allow fluid to flow into said chamber, and a fluid outlet in fluid communication with the fluid reservoir to return treated fluid to the fluid reservoir, and providing a mounting fixture for mounting and carrying the fluid chamber and permitting treatment system to be retro-fitted to any existing fluid circulating system without the need for changing and adapting the existing piping and electrical system incident to the fluid circulation system.

* * * * *